United States Patent
Abebe et al.

(10) Patent No.: US 9,659,502 B1
(45) Date of Patent: May 23, 2017

(54) DRONE RANGE EXTENSION VIA HOST VEHICLES

(71) Applicant: International Business Machines Corporation, Armonk, NY (US)

(72) Inventors: Ermyas Abebe, Altona (AU); Anton Beloglazov, South Yarra (AU); Dileban Karunamoorthy, Carlton (AU); Jan Richter, Hawthorn (AU); Kent Charles Barton Steer, Brunswick (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/973,861

(22) Filed: Dec. 18, 2015

(51) Int. Cl.
- *B64C 39/00* (2006.01)
- *G08G 5/00* (2006.01)
- *B64C 39/02* (2006.01)
- *B60L 11/18* (2006.01)

(52) U.S. Cl.
CPC ........ *G08G 5/0034* (2013.01); *B60L 11/1809* (2013.01); *B64C 39/024* (2013.01); *B64C 2201/128* (2013.01); *B64C 2201/141* (2013.01); *B64C 2201/208* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,296,894 A | * | 10/1981 | Schnabele | F42B 15/10 244/3.1 |
| 4,471,923 A | * | 9/1984 | Hoppner | F41F 3/042 244/3.1 |
| 4,890,554 A | * | 1/1990 | Schleimann-Jensen | F42B 10/62 102/384 |
| 6,712,312 B1 | * | 3/2004 | Kucik | B64C 39/024 244/1 R |
| 7,182,290 B2 | * | 2/2007 | Sliwa | A63H 27/02 244/53 A |
| 7,798,445 B2 | * | 9/2010 | Heppe | B64F 1/02 244/100 A |
| 7,893,390 B2 | * | 2/2011 | Fisch | F42B 15/10 244/117 R |
| 8,511,606 B1 | | 8/2013 | Lutke et al. | |
| 2014/0129059 A1 | | 5/2014 | Scarlatti et al. | |
| 2014/0319272 A1 | | 10/2014 | Casado Magana et al. | |

(Continued)

Primary Examiner — Yonel Beaulieu
(74) Attorney, Agent, or Firm — Harrington & Smith; Louis J. Percello (57) ABSTRACT

Apparatus, method, computer program product, and system described for an autonomous vehicle (a drone) which uses one or more hosts to transport that drone on its journey. Potential hosts along the envisioned journey can be rated as to their suitability. That rating along with an indication of the value of traveling under its own power or remaining stationary for a particular time can be evaluated at any point along the journey to produce an effective route, time, cost, or whatever other factor is desirable. The drone can chose between these states and communicate with potential hosts and even stationary positions or it can remain in the mode it was just in. The drone can switch between one host and another, be charged by a host or at a stationary location, and can evaluate the different modes differently depending on the needs of the user and the drone itself.

14 Claims, 5 Drawing Sheets

(56) References Cited

U.S. PATENT DOCUMENTS

| | | | | |
|---|---|---|---|---|
| 2015/0323933 A1* | 11/2015 | Darbois | ............... | G05D 1/0005 701/4 |
| 2016/0009363 A1* | 1/2016 | Valasek | .................... | B64C 1/22 244/13 |
| 2016/0107750 A1* | 4/2016 | Yates | .................... | B64C 39/024 244/2 |

* cited by examiner

DRONE RANGE EXTENSION VIA HOST VEHICLES

TECHNICAL FIELD

This invention relates generally to the use of unmanned vehicles known as drones and how to extend the range of such vehicles.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Drone technology has reached the point where companies such as Amazon and DHL are proposing their use for package delivery. Due to their weight and freedom of movement, drones offer improvements in speed and cost of delivery. Other uses include first-aid assistants, emergency monitoring, and fast-food delivery.

As found in the state of the art as of the time of this invention, drones are required to provide all of their own locomotive power. However, a major technical limitation of current drones is their range, which reduces their serviceable market. This limitation is due to the capacity of their energy store, such as batteries, in relation to the weight of the vehicle. The range of such drones is currently extended through various recharging strategies, energy density, and aerodynamics.

Certain prior inventions discuss overcoming limitations of drones. US 2014/0254896 A1 discusses unmanned drone, robot system for delivering mail, goods, humanoid security, crisis negotiation, mobile payments, smart humanoid mailbox and wearable personal exoskeleton heavy load flying machine. Vertical take-off and landing multimodal, multi-environment, gyropendular craft with compensatory propulsion and fluidic gradient collimation is discussed in US 2013/0206915 A1, which is an example of how to land in various environments. Transportation using network of unmanned aerial vehicles in US 2014/0032034 describes a system of deliveries that utilizes drones and base stations. A method of and apparatus for extending the operation of an unmanned aerial vehicle in EP 2664539 A1 describes a method for extending operation through detecting a recharging need, although such a system requires specialized infrastructure distributed throughout a region. Vehicle base station of U.S. Pat. No. 8,862,288 describes a platform on which a drone can swap its battery. Such an approach requires a network of such platforms.

The current invention moves beyond these techniques and materials.

BRIEF SUMMARY

This section is intended to include examples and is not intended to be limiting.

According to a first aspect of the present invention, a method comprises inputting a journey for a drone; generating a set of host candidates along the journey; at any location along the journey, computing a host utility score for each host candidate; at the location along the journey, computing a self-propulsion utility score for traveling solo; at the location along the journey, computing a stationary mode utility score for remaining at the location; based on the host utility score for each host candidate, the self-propulsion utility score, and the stationary mode utility score, evaluating a mode transition state from at least one of host candidate (host candidate 1, host candidate 2, . . . , host candidate N), self-propulsion, and stationary; based on the mode transition state evaluation, in response to the mode state evaluation indicating a change of mode transition, choosing the mode transition for the drone; and controlling the drone to negotiate the mode transition at the location along the journey.

According to a second aspect of the present invention, an apparatus that comprises at least one processor and at least one memory including computer program code, such that the at least one processor, in response to execution of the computer program code, is configured so the apparatus performs or controls at least the following: generating a set of host candidates along a journey; at any location along the journey, computing a host utility score for each host candidate; at the location along the journey, computing a self-propulsion utility score for traveling solo; at the location along the journey, computing a stationary mode utility score for remaining at the location; based on the host utility score for each host candidate, the self-propulsion utility score, and the stationary mode utility score, evaluating a mode transition state from at least one of host candidate (host candidate 1, host candidate 2, . . . , host candidate N), self-propulsion, and stationary; and based on the mode transition state evaluation, in response to the mode state evaluation indicating a change of mode transition, choosing the mode transition for the drone.

According to a third aspect of the present invention, a computer program product which is embodied on a non-transitory computer-readable medium that has a computer program stored therein, so that when it executed by a computer, it is configured to provide instructions to control or carry out: receiving an input for a journey for a drone; generating a set of host candidates along the journey; at any location along the journey, computing a host utility score for each host candidate; at the location along the journey, computing a self-propulsion utility score for traveling solo; at the location along the journey, computing a stationary mode utility score for remaining at the location; based on the host utility score for each host candidate, the self-propulsion utility score, and the stationary mode utility score, evaluating a mode transition state from at least one of host candidate (host candidate 1, host candidate 2, . . . , host candidate N), self-propulsion, and stationary; based on the mode transition state evaluation, in response to the mode state evaluation indicating a change of mode transition, choosing the mode transition for the drone; and outputting a control for the drone to negotiate the mode transition at the location along the journey.

DETAILED DESCRIPTION OF THE DRAWINGS

In order to overcome some of the disadvantages of current approaches, we disclose here a system and method for extending the range of drones through strategic utilization of host vehicles. The invention includes a mechanism for selecting a host from a collection of candidates. We also describe how and when a drone separates from a host.

Previous efforts to extend the range of drones have focused on energy density, aerodynamics, base-station positioning, and recharging options.

For example, some of the patents listed disclose battery recharging/swapping stations and drone-to-drone communication. However, none of the references discloses a system for utilizing other vehicles as transportation means to extend the range of drones, a system for computing which vehicle or network of vehicles a drone should use to this effect, nor on the negotiation between a drone and a vehicle. Also, increasing the energy capacity of drones increases their weight and thus their energy consumption; bigger batteries will not solve the problem.

In contrast to the references, the current invention utilizes an existing transportation network and its users wherein there are already vehicles travelling to and from most places that drones travel to. If the drone and its payload constitute a small additional weight for these potential host vehicles, then there is an opportunity for mutual benefit.

The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Without in any way limiting the scope, interpretation, or application of the claims appearing below, an advantage or technical effect of one or more of the exemplary embodiments disclosed herein is that a drone that does not have to power itself for an entire journey can conserve energy and reach a wider area.

Another technical effect of one or more of the exemplary embodiments disclosed herein is that if a drone can recharge on a moving host it can gain territorial coverage with the host and with additional power to the drone without building a heavier drone to contain a larger battery or other power reserve.

Another technical effect of one or more of the exemplary embodiments disclosed herein is that by using a host or hosts, a drone can travel to areas where a drone might typically be restricted from such as no-fly-zones or over bodies of water that would deplete the drone's energy reserves or even through a tunnel, when a drone could not cross a body of water or go over a mountain.

Another technical effect of one or more of the exemplary embodiments disclosed herein is that users of such drones as described herein using hosts could programs routes heretofore unimaginable because of the distances, geography, or time involved.

Without in any way limiting the scope, interpretation, or application of the claims appearing below our solution comprises the following actors: drones and hosts Drones are autonomous or semi-autonomous vehicles; they can move themselves in space. The distance they can move depends on their available energy, their efficiency, and environmental factors. Each drone is assumed to have zero or more destinations, where each destination can be associated with some payload.

Hosts are vehicles that move throughout the transportation network with their own destination. Examples include trains, buses, and privately owned cars. Further examples could include boats and planes; it is even conceivable that other unmanned vehicles could serve as hosts (such as autonomous cars). Moreover, even a person might need to carry a drone for a small portion of the journey and might act as a host although any data transmitted from such a host could need to originate by entering it in a database. Thus, a horse and buggy could also be a host. It is useful, although not necessary, to assume drones are small in comparison to hosts, such that the marginal cost to the host of carrying the drone is negligible.

In our system a drone can be in one of three modes: Stationary; On-host; and Self-propelled.

In the Stationary mode the drone is not travelling. For example, the drone could be waiting for a job or waiting for a host. In this stationary mode, the energy consumption of the drone would be very low. Moreover, if the drone is at a recharge/refuel/swap station, then the drone can increase its energy store while it is in this stationary mode.

In the On-host mode, the drone is attached in some way to a host vehicle where it would follow the same trajectory as that host vehicle. Energy consumption is very low in this mode. If the host is equipped with a recharge/refuel/swap mechanism the drone can increase its energy store. In general, there can be more than one host for a particular transit of the drone and the drone may move between different hosts. There may also in some cases be more than one drone on each host.

In the Self-propelled mode, the drone is controlling its own path through space. Since the drone is operating under its own power in this mode, the energy consumption could be high in this mode.

In general the drone can transition between modes at any time depending upon the needs of the drone, the availability of hosts, and the need and availability of inactivity time of the drone. A decision to transition would be based on the expected reward from moving to that mode. The expected reward of each mode is calculated by the three scoring modules: stationary, on host, and self-propelled.

Figure 1:
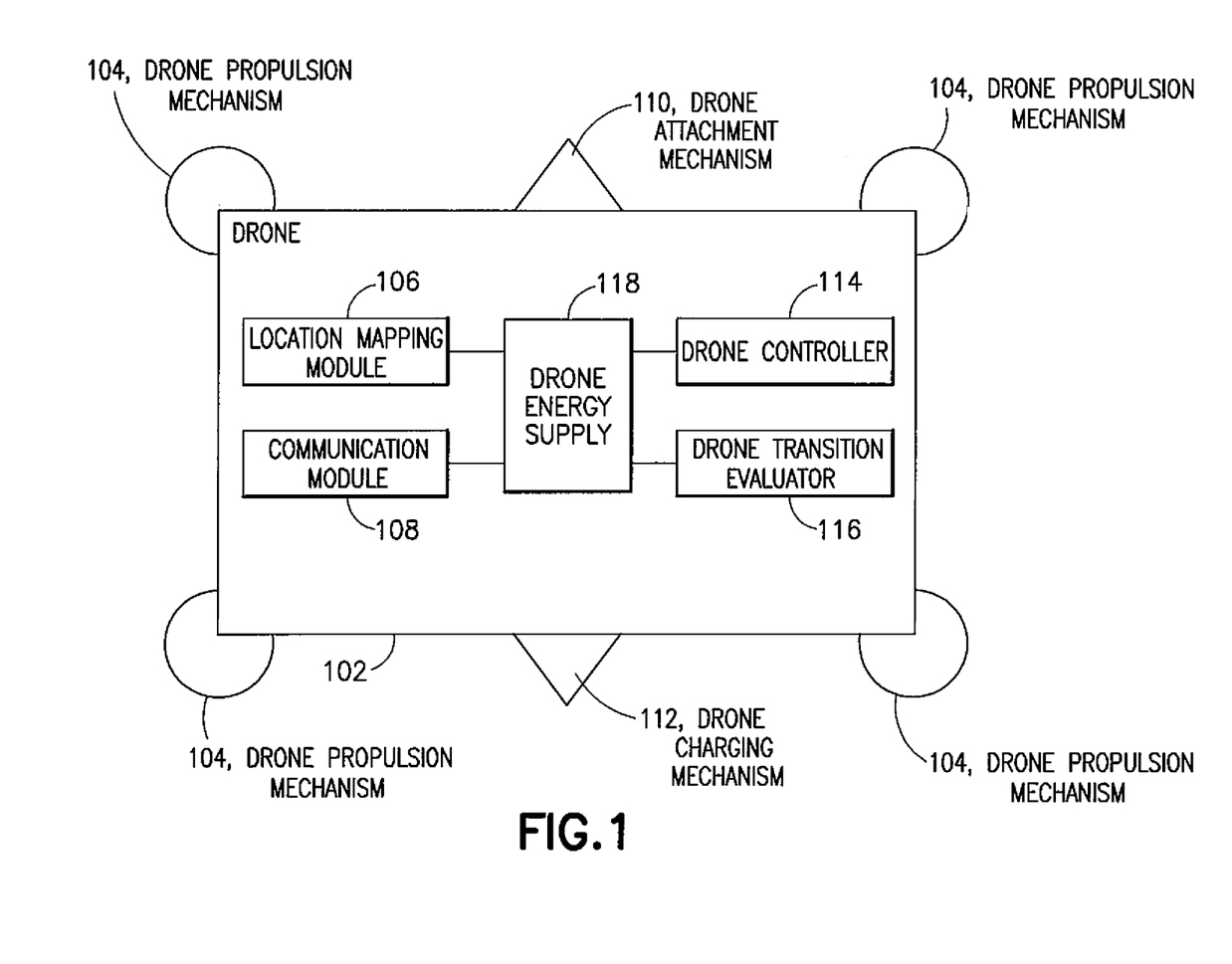
FIG. 1 is a block diagram of one possible and non-limiting exemplary system in which the exemplary embodiments may be practiced.

Referring to FIG. 1, which is a block diagram representation of an exemplary embodiment of a drone employing the current invention, drone 102 is physically able to travel on its own by drone propulsion mechanism 104 which may include a variety of engines and propellers and other instrumentation not shown. Drone 102 is powered by drone energy supply 118 which can replenish itself at least through drone charging mechanism 112. For instance if drone energy supply 118 is some type of battery power, then drone charging mechanism 112 could be for instance some kind of mechanism that allows the drone to charge itself electrically. Nonetheless, this is by no means a limitation, such that drone energy supply 118 could be a storage of some type of volatile fluid such as gasoline and drone charging mechanism 112 may consist of tubes and other apparatus to allow replenishment of such fluid such as gasoline.

Also, as part of the drone structure itself, there would be a drone attachment mechanism 110 would attach drone 102 to a prospective host and also allow for detachment therefrom. Within the innards of the drone itself or via communication with instrumentation external to the drone would be a location mapping module 106, a drone controller 114, and a drone transition evaluator 116. Communication with these modules and some remote location could be through communication module 108. If modules 106, 114, and 116 are not resident in the drone 102 itself, then communication module 108 would receive signals to effectuate the use of such models. Nonetheless, as a nonlimiting embodiment of the current invention, functions such as the location mapping module 106, the drone transition evaluator 116, and the drone controller 114 would be thought to be resident in drone 102 so as to give the drone as much autonomy as possible. Communication module 108 could be used to coordinate activities with hosts, charging stations, and/or the drone's owner or user.

Figure 2:
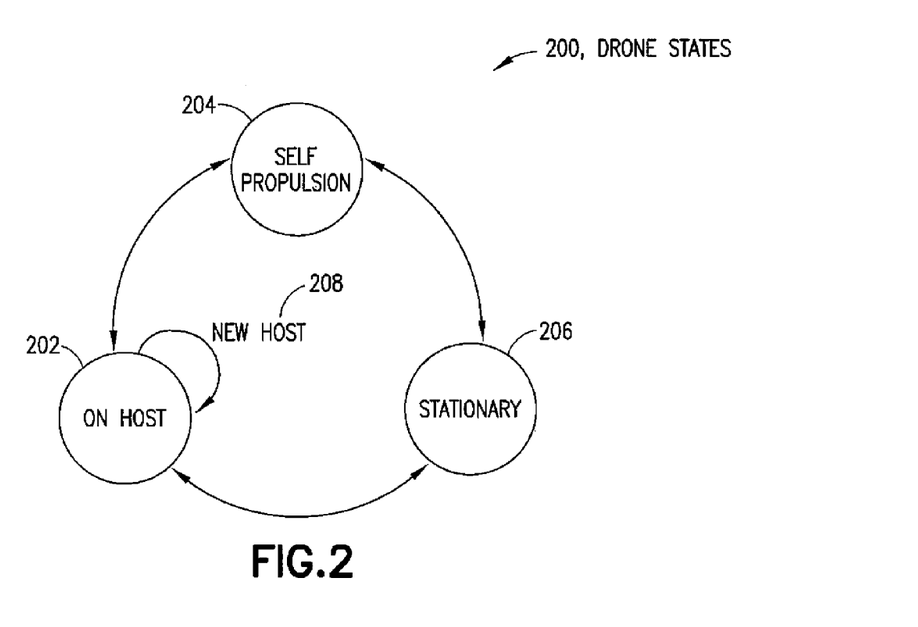
FIG. 2 is a block diagram showing the drone states or rather the transition states that would be available to a drone based on the expected reward from moving to that mode.

FIG. 2 is a block diagram showing the drone states or rather the transition states that would be available to a drone based on the expected reward from moving to that mode. As can be seen from FIG. 2, drone states 200 can consist of three states, namely the on host state 202, the self propulsion state 204, and the stationary state 206. As can be seen from the arrows in the diagram the transition between any of the states to another state is possible. Also note that a transition from on host state 202 a new host 208 is also possible without necessarily transitioning to self propulsion state 204 or stationary state 206.

Figure 3:
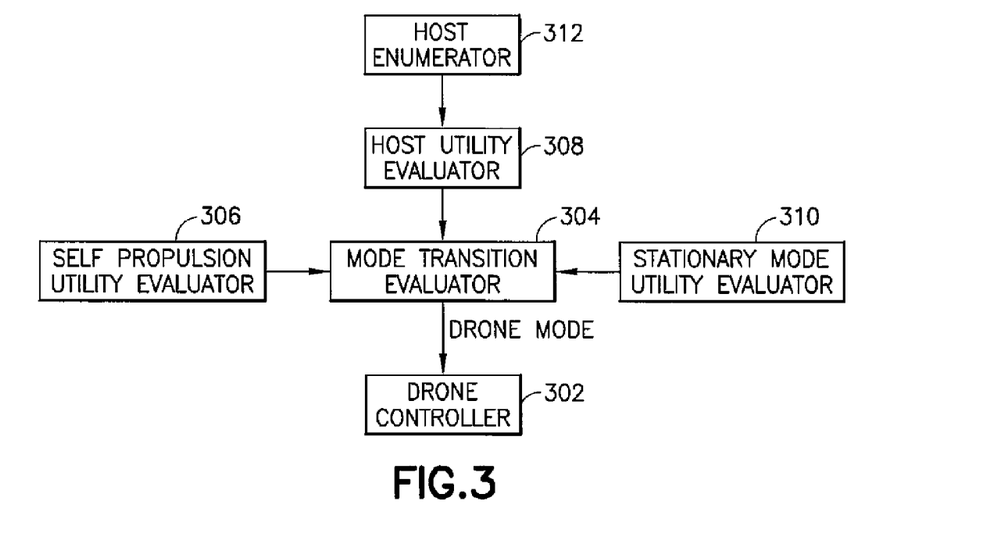
FIG. 3 is a block diagram representation of an exemplary embodiment of the current invention which shows a system diagram regarding the accessing of information, the evaluation of this information, and the controlling of the drone via that information.

FIG. 3 is a block diagram representation of an exemplary embodiment of the current invention which shows a system diagram regarding the accessing of information, the evaluation of this information, and the controlling of the drone via that information. Drone controller 302 receives an evaluation of what mode or state it should transition to via the mode transition evaluator 304. Mode transition evaluator 304 receives information from utility evaluators which evaluate the utility of each of the various states. Therefore mode transition evaluator 304 receives input from self propulsion utility evaluator 306, host utility evaluator 308, and stationary mode utility evaluator 310. Additionally, host utility evaluator 308, to find an appropriate host, needs to have input from a host enumerator 312 so either module could require access to external communication links. Moreover, in the search to replenish its energy supply, a drone in question would need input to determine whether a prospective host (or a host to which it is already attached to) or some stationary location would provide the proper replenishment of its energy supply. Therefore, the drone may need to acquire information from the host on the availability of a recharge capability. This information would be used by the host enumerator 312, host utility evaluator 308, or stationary mode utility evaluator 310.

As noted earlier, either within the drone itself or at some device in communication with the drone to enable its control, a module would be associated with each evaluator such that there would be a Host utility evaluator module, Stationary mode utility evaluator module, and Self-propulsion utility evaluator module.

Concerning the Host utility evaluator module, for each "available" host a score is calculated that captures the extent to which that mode will bring the drone to its destination. The score may also capture other benefits such as the availability of a recharge mechanism on the host. Additionally, the score may incorporate any costs associated with the host, e.g., a payment. The list of available hosts should include the current host, if applicable. The score for every other host should therefore also incorporate the cost of moving between hosts. Similarly, the cost of moving from stationary or self-propelled to a host should be incorporated into the score for that host.

Concerning the Stationary mode utility evaluator module, the stationary scoring module produces a score that reflects the extent to which remaining in the current location brings the drone to its destination. This may happen when the current host is no longer moving towards the destination. Alternately, the host may be crossing a major transport corridor on which there is likely to appear a new host that will bring the drone to its destination. Another possibility is that the current location provides a refuel/recharge facility.

Concerning the Self-propulsion utility evaluator module, in this module a score is computed that reflects the extent to which self-propulsion will bring the drone to its destination. This score will be high when the destination is within the solo flying range; this will normally be the case at the end of the drone's journey. Alternately, there may be a situation mid-journey where it is beneficial to travel some distance under self-propulsion. For example, there may be a major transport corridor some distance from the path of the current host where it is likely that there will be a new host that will bring the drone to its destination. As Such, this module may utilize a statistical model of the traffic in the transport network to estimate the likelihood of a host appearing that will bring the drone to its destination. Alternatively, if explicit information is available on the paths of host vehicle(s) this could be used to more accurately evaluate a score.

The mode transition evaluator would also be resident in a module which would determine the relative factors that each of the other module brings to bear including possibly the time needed to complete the transit of the drone on its journey from its start point to its end point (destination), the relative costs involved both in terms of time and money, and the capacity of the drone itself to accomplish particular tasks. For instance, if the drone is transporting a perishable item of great value, for example blood plasma, the speed of the transit might outweigh particular costs. Other cost-benefit analyses could be worked into that mode transition evaluator module.

Figure 4:
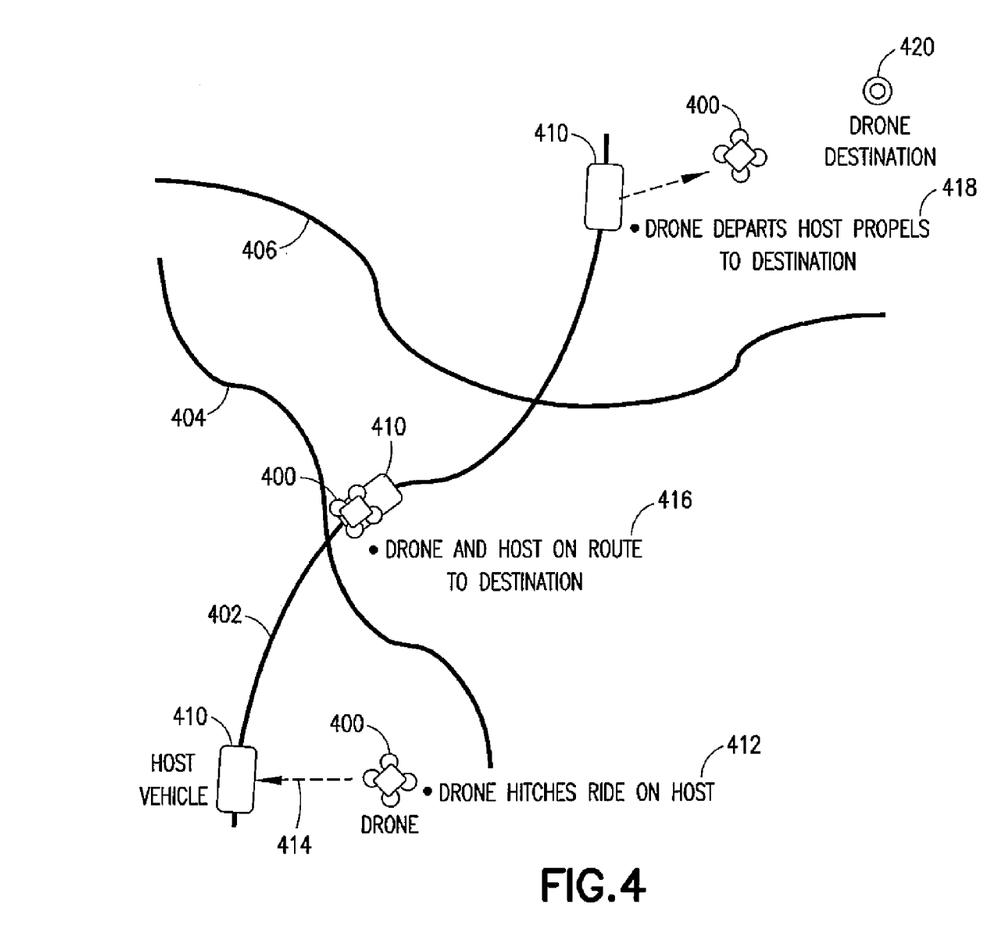
FIG. 4 is a pictorial representation of an example of a scenario where a single host is used by the drone.

Turning to FIG. 4, which gives an example of a scenario where a single host is used by the drone. FIG. 4 depicts 3 paths being shown, namely, path 402, path 404, and path 406. As there is only one host vehicle in this example, paths 404 and 406 will not be utilized in this scenario. However, any of these paths can be by any of the means discussed earlier whether by car, truck, boat, plane, or even other autonomous vehicles. Drone 400 and host vehicle 410 are pictured at three various sites along the path 402. At 412, drone 400 is at some location prior to its encounter with the host vehicle and at point 414 connects itself with the host vehicle, thus hitching a ride with it. Further along the path it can be seen at point 416 along path 402, the drone 400 is traveling en route to its destination in conjunction with host vehicle 410.

In this scenario the drones destination point 420 is off the path 402 that host vehicle 410 is taking. Therefore, at point 418 along path 402 the drone 400 disengages from drone 410 and propels itself from the conjoint state 418 to the final drone destination 420.

Figure 5:
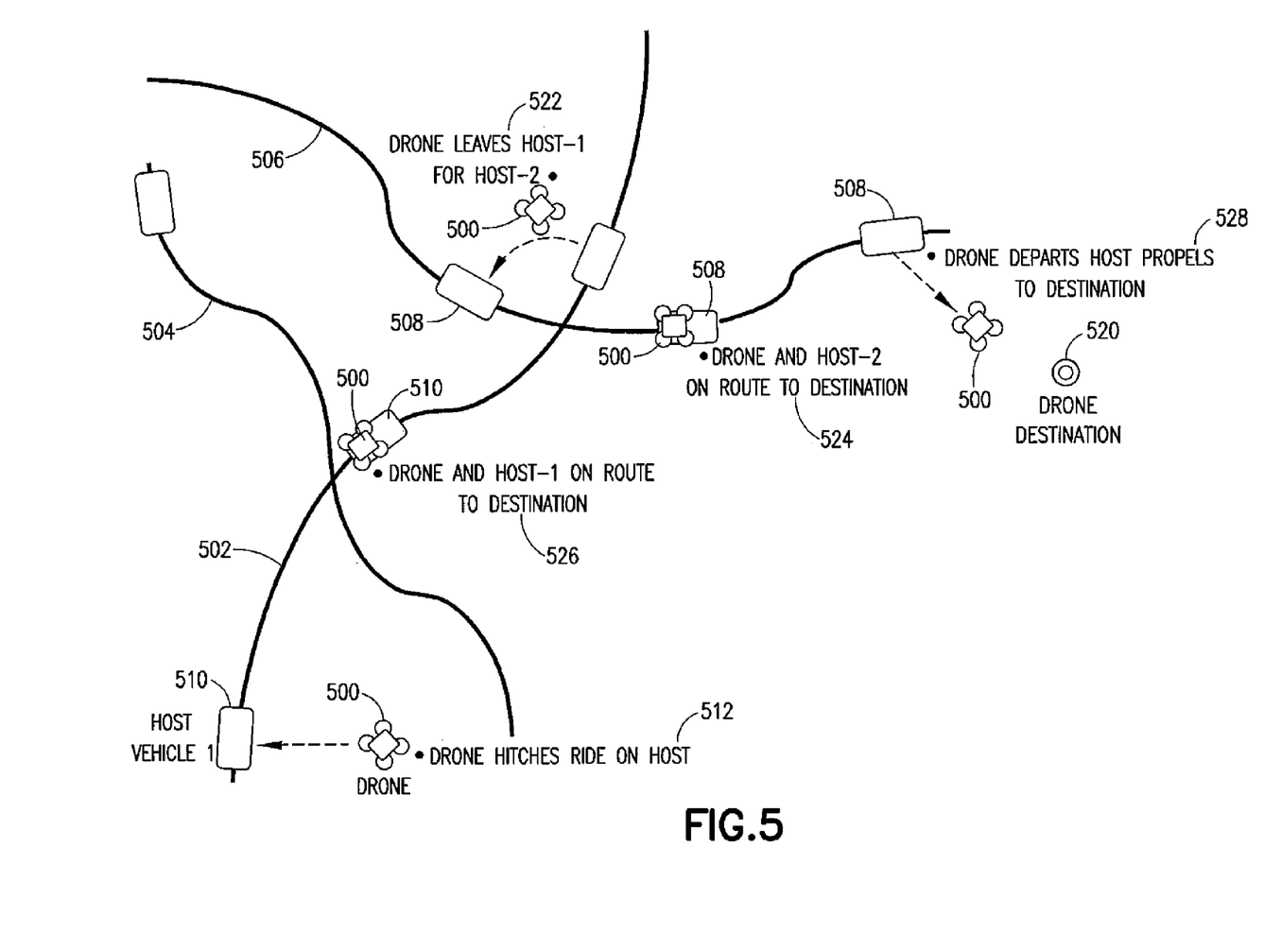
FIG. 5 is a pictorial representation of an example of a multi-host scenario.

FIG. 5 is a pictorial representation of an example of a multi-host scenario. FIG. 5 depicts, in a similar manner to FIG. 4, paths 502, 504, and 506 at this time when the drone 500 starts at location 512 it will utilize two separate hosts, namely host 508 which transits on path 506 and host 510 which transits on path 502.

Thus, drone 500 begins its journey at location 512 en route to its final destination 520. Drone 500 proceeds from location 512 to intersect the first host vehicle 510 on path 502. After some time elapses, it can be seen that drone 500 and the first host 510 are en route at junction 526 to the final destination 520 via path 502. As time elapses, the first host vehicle 510 will go in a direction not consistent with getting to the final destination 520. Throughout the route, various evaluations are made. At the juncture shown as location 522 drone 500 transitions from host 510 to host 508. Naturally, if drone 500 is aware of the movements of host 510 and host 508 but host 508 is not at the proper destination 522 for drone 500 to transition to, the drone could go into stationary mode at that point for some period of time or could even wait at a charging station if necessary. However those alternatives are not mandatory but rather permissive. Once at junction 522 drone 500 transitions from host 510 to host 508 the conjoined drone 500 and host 508 can be seen at junction 524 on path 506. Later, at junction 528 drone 500 separates from host 508 to travel autonomously to final destination 520.

Figure 6:
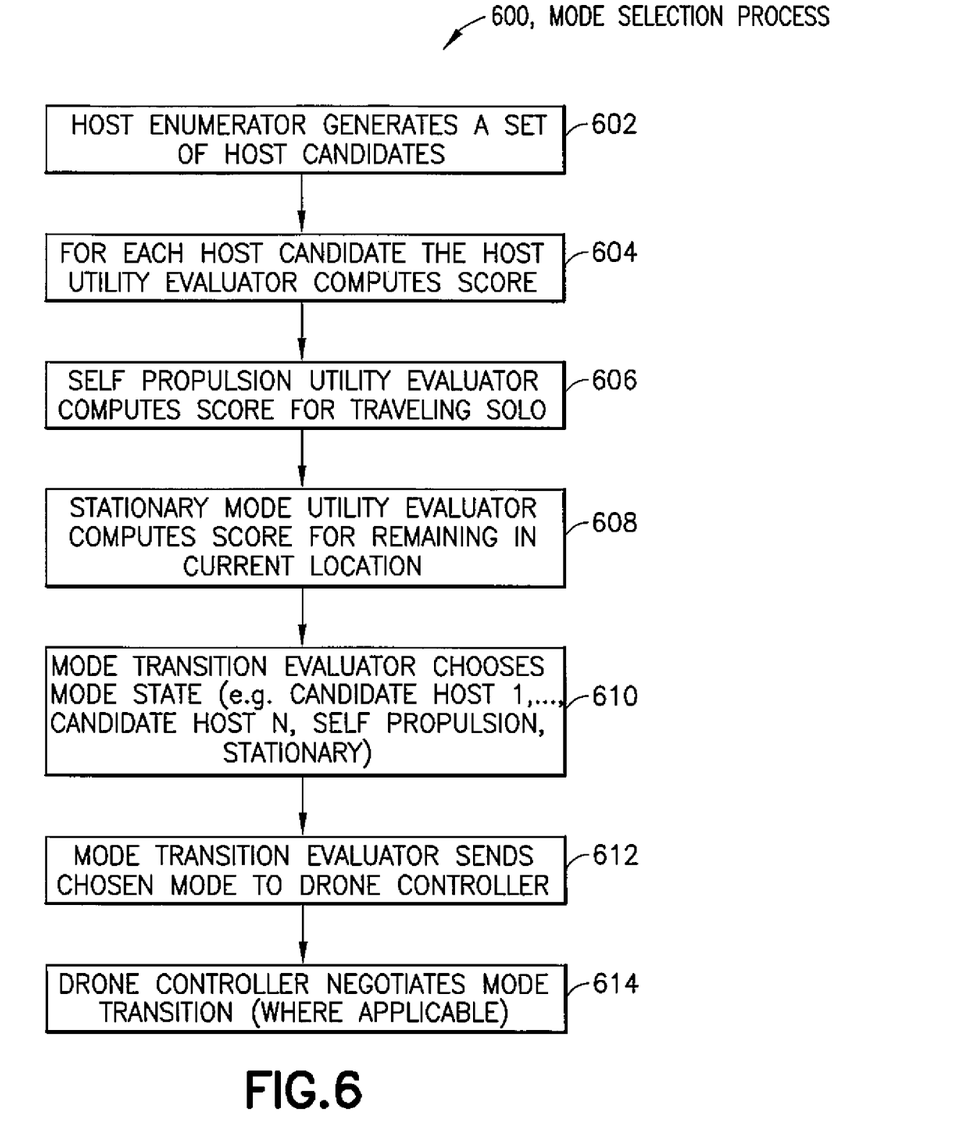
FIG. 6 is a flowchart of an exemplary method of exemplary steps involved in the mode transition selection process and illustrates the operation of an exemplary method, a result of execution of computer program instructions embodied on a computer readable memory, functions performed by logic implemented in hardware, and/or interconnected means for performing functions in accordance with exemplary embodiments.

An example of a process by which modes and hosts are chosen is shown in FIG. 6, which is a flowchart of an exemplary method of exemplary steps involved in that selection process.

Thus, mode selection process 600 comprises the step represented by block 602 wherein the host enumerator generates a list of host candidates. The step represented by block 602 teaches that for each host candidate, the host utility evaluator computes a score.

The self propulsion utility evaluator computes a score for the drone to travel solo as represented in the step represented by block 606. The stationary mode utility evaluator computes a score for remaining in the current location as represented in the step in block 608.

The inputs from these various evaluations then culminate in a decision represented by the step in block 610 where the mode transition evaluator chooses the mode from either remaining stationary, proceeding under self propulsion, or choosing hosts 1, 2, 3, . . . N. Since the number of hosts could vary widely, depending on a variety of factors, for example, the length of the journey versus drone energy consumption, the value N would represent an integer, where N=0 would mean not to choose a host, and N=3 would mean 3 hosts.

If desired, the different functions discussed herein may be performed in a different order and/or concurrently with each other. Furthermore, if desired, one or more of the above-described functions may be optional or may be combined.

Host negotiation can occur through one of numerous possible mechanisms. The details of these are not part of this disclosure. This could include establishing a communication link, informing the host of intention to dock, exchange of docking details, payment, recharge/refuel, logging, etc.

With respect to a host device, such a mechanism could comprise one or more motor platforms; one or more carriers for attaching, releasing, and holding a drone; one or more communication devices for communicating an attachment protocol to one or more drones where the mobile device is capable of communicating the attachment protocol to enable the carrier to attach the drone, the motive platform is capable of caring the drone for some distance, and the carrier or host is capable of releasing the drone after transporting the group drone over that distance. Moreover such a device might comprise a power exchanging device such as, for example, battery swap, a battery charger, or some such other device capable of providing charging power to the drone. The host and the drone would further need some kind of communication device between them that transmits and/or receives information from one another. As noted earlier, the host platform could be any type of vehicle whether autonomous or not such as a train, boat, plane, or even another drone where that other drone would act as the host. Moreover, in communicating with one another, the drone in the host can communicate and negotiate the price for drone transport, charging power from the host to the drone, and other aspects and expenses that would incur for the drone to piggyback on the host.

There can also be a network of host devices such that a drone would have a selection of which host to choose from. These host devices may have various aspects as to what distances they travel, the direction or vector of the distance, the price of transport, etc. Thus, in such a network of various hosts, the drone would need to have an optimizer that determines which and/or what sequence of hosts would be optimal for the drone to reach its destination. Such optimality may be determined by such things as the aggregate distance, the aggregate price, or any combination thereof. In fact, a network of devices may include a variety of hosts, drones, and stationary locations so the drones have a choice of mode within that network. The drone could also wait at a stationery platform until a suitable host arrives or is available. Moreover, the choice made the left to the hosts themselves as to which drones they choose. Furthermore, at stationary platforms there could be instances of parking where the platform has limited space and so it has an impact on how drones choose it. On the other hand, the choice may up to the stationary platform itself to choose which drones can avail themselves of that stationary platform. Additionally, the stationary platforms or mobile hosts may provide charging capability to the drones and while a drone might want to charge on a particular host the host might need that energy to propel itself and not be able to charge drone so cross functions as to what drone the host will take can also be fed either into some module within the host or some module within the drone so that an optimal choice can be made amongst the various devices. And, as stated earlier, the drone may recharge itself at a stationery platform and the same restrictions as just described regarding the mobile host could apply to the stationery platform and vice versa.

A group of any combination of drones, hosts, and stationary locations could be thought of as a system.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer or any of the modules described and depicted, e.g., in FIG. 1. A computer-readable medium may comprise a computer-readable storage medium that may be any media or means that can contain, store, and/or transport the instructions for use by or in connection with an instruction execution system, apparatus, or device, such as a computer. A computer-readable storage medium does not comprise propagating signals.

An example of an embodiment, which can be referred to as item 1, is a method that comprises inputting a journey for a drone; generating a set of host candidates along the journey, at any location along the journey, computing a host utility score for each host candidate; at the location along the journey, computing a self propulsion utility score for traveling solo; at the location along the journey, computing a stationary mode utility score for remaining at the location; based on the host utility score for each host candidate, the self propulsion utility score; and the stationary mode utility score, evaluating a mode transition state from at least one of the following: host candidate 1, host candidate 2, host candidate N, self propulsion, and stationary; based on the mode transition state evaluation, in response to the mode state evaluation indicating a change of mode transition, choosing the mode transition for the drone; and controlling the drone to negotiate the mode transition at the location along the journey.

An example of a further embodiment, which can be referred to as item 2, is the method of item 1 wherein the host comprises a separate transportation system, either manned or autonomous, capable of transporting the drone under a power supply of the host.

An example of a further embodiment, which can be referred to as item 3, is the method of item 1, wherein evaluating the mode state comprises an indication of the energy supply of the drone.

An example of a further embodiment, which can be referred to as item 4, is the method of item 1 wherein evaluating the mode state comprises an indication of which mode if any would be suitable for replenishing the energy supply of the drone.

An example of a further embodiment, which can be referred to as item 5, is the method of item 1 wherein evaluating the mode state comprises an indication of cost of transitioning.

An example of a further embodiment, which can be referred to as item 6, is the method of item 1, wherein evaluating the mode state comprises an indication of a comparative journey duration.

An example of a further embodiment, which can be referred to as item 7, is the method of item 1, wherein choosing the mode transition is based on a reward, wherein a reward is a favored benefit of a particular score.

An example of a further embodiment, which can be referred to as item 8, is the method of item 1, wherein a score is based on at least one of the following factors: cost, energy supply of the drone, recharging availability, time of journey, duration of state, and distance at the location compared to a start location or an end location or both the start and the end locations of the journey.

An example of another embodiment of the present invention, which can be referred to as item 9, is an apparatus comprising: at least one processor; at least one memory including computer program code, wherein the at least one processor, in response to execution of the computer program code, is configured to cause the apparatus to perform at least the following: generating a set of host candidates along a journey; at any location along the journey, computing a host utility score for each host candidate; at the location along the journey, computing a self propulsion utility score for traveling solo; at the location along the journey, computing a stationary mode utility score for remaining at the location; based on the host utility score for each host candidate, the self propulsion utility score, and the stationary mode utility score, evaluating a mode transition state from at least one of the following: host candidate 1, host candidate 2, . . . , host candidate N, self propulsion, and stationary; and based on the mode transition state evaluation, in response to the mode state evaluation indicating a change of mode transition, choosing the mode transition for the drone.

An example of a further embodiment, which can be referred to as item 10, is the apparatus of item 9, wherein the apparatus travels the journey.

An example of a further embodiment, which can be referred to as item 11, is the apparatus of item 10, wherein the at least one processor, in response to execution of the computer program code, is further configured to cause the apparatus to perform at least the following: controlling the apparatus to negotiate the mode transition at the location along the journey.

An example of a further embodiment, which can be referred to as item 12, is the apparatus of item claim 9, further comprising: a propulsion system allowing for the apparatus to travel autonomously; a docking mechanism for attaching the apparatus to a host; and a carry mechanism for transporting an item.

An example of a further embodiment, which can be referred to as item 13, is the apparatus of item claim 9, further comprising: a power supply; and a charging mechanism that can be attached to a host.

An example of a further embodiment, which can be referred to as item 14, is the apparatus of item 9, further comprising: a communications mechanism to at least communicate with a host.

In another example of an embodiment of the current invention, which can be referred to item 15, a computer program product embodied on a non-transitory computer-readable medium in which a computer program is stored that, when being executed by a computer, would be configured to provide instructions to control or carry out receiving an input for a journey for a drone; generating a set of host candidates along the journey; at any location along the journey, computing a host utility score for each host candidate; at the location along the journey, computing a self propulsion utility score for traveling solo; at the location along the journey, computing a stationary mode utility score for remaining at the location; based on the host utility score for each host candidate, the self propulsion utility score, and the stationary mode utility score, evaluating a mode transition state from at least one of the following: host candidate 1, host candidate 2, . . . , host candidate N, self propulsion, and stationary; based on the mode transition state evaluation, in response to the mode state evaluation indicating a change of mode transition, choosing the mode transition for the drone; and outputting a control for the drone to negotiate the mode transition at the location along the journey.

It is also noted herein that while the above describes example embodiments of the invention, these descriptions should not be viewed in a limiting sense. Rather, there are several variations and modifications which may be made without departing from the scope of the present invention as defined in the appended claims.

Although various aspects of the invention are set out in the independent claims, other aspects of the invention comprise other combinations of features from the described embodiments and/or the dependent claims with the features of the independent claims, and not solely the combinations explicitly set out in the claims.

What is claimed is:

1. A method comprising:
inputting a journey for a drone;
generating a set of host candidates along the journey,
at any location along the journey, computing a host utility score for each host candidate;
at the location along the journey, computing a self propulsion utility score for traveling solo;
at the location along the journey, computing a stationary mode utility score for remaining at the location;
based on the host utility score for each host candidate, the self propulsion utility score, and the stationary mode utility score, evaluating a mode transition state from at least one of the following:
host candidate 1, host candidate 2, . . . , host candidate N,
self propulsion, and
stationary;
based on the mode transition state evaluation, in response to the mode state evaluation indicating a change of mode transition, choosing the mode transition for the drone; and
controlling the drone to negotiate the mode transition at the location along the journey.

2. The method of claim 1, wherein the host comprises a separate transportation system, either manned or autonomous, capable of transporting the drone under a power supply of the host.

3. The method of claim 1, wherein evaluating the mode state comprises an indication of the energy supply of the drone.

4. The method of claim 1, wherein evaluating the mode state comprises an indication of which mode if any would be suitable for replenishing the energy supply of the drone.

5. The method of claim 1, wherein evaluating the mode state comprises an indication of cost of transitioning.

6. The method of claim 1, wherein evaluating the mode state comprises an indication of a comparative journey duration.

7. The method of claim 1, wherein choosing the mode transition is based on a reward, wherein a reward is a favored benefit of a particular score.

8. The method of claim 1, wherein a score is based on at least one of the following factors:
cost,
energy supply of the drone,
recharging availability,
time of journey,
duration of state, and
distance at the location compared to a start location or an end location or both the start and the end locations of the journey.

9. An apparatus comprising:
at least one processor;
at least one memory including computer program code, wherein the at least one processor, in response to execution of the computer program code, is configured to cause the apparatus to perform at least the following:
generating a set of host candidates along a journey;
at any location along the journey, computing a host utility score for each host candidate;
at the location along the journey, computing a self propulsion utility score for traveling solo;
at the location along the journey, computing a stationary mode utility score for remaining at the location;
based on the host utility score for each host candidate, the self propulsion utility score, and the stationary mode utility score, evaluating a mode transition state from at least one of the following:
host candidate 1, host candidate 2, . . . , host candidate N,
self propulsion, and
stationary;
based on the mode transition state evaluation, in response to the mode state evaluation indicating a change of mode transition, choosing the mode transition for the drone; and
controlling the apparatus to negotiate the mode transition at the location along the journey.

10. The apparatus of claim 9, wherein the apparatus travels the journey.

11. The apparatus of claim 9, further comprising:
a propulsion system allowing for the apparatus to travel autonomously;
a docking mechanism for attaching the apparatus to a host; and
a carry mechanism for transporting an item.

12. The apparatus of claim 9, further comprising:
a power supply; and
a charging mechanism that can be attached to a host.

13. The apparatus of claim 9, further comprising:
a communications mechanism to at least communicate with a host.

14. A computer program product embodied on a non-transitory computer-readable medium in which a computer program is stored that, when being executed by a computer, is configured to provide instructions to control or carry out:
receiving an input for a journey for a drone;
generating a set of host candidates along the journey;
at any location along the journey, computing a host utility score for each host candidate;
at the location along the journey, computing a self propulsion utility score for traveling solo;
at the location along the journey, computing a stationary mode utility score for remaining at the location;
based on the host utility score for each host candidate, the self propulsion utility score, and the stationary mode utility score, evaluating a mode transition state from at least one of the following:
host candidate 1, host candidate 2, . . . , host candidate N,
self propulsion, and
stationary;
based on the mode transition state evaluation, in response to the mode state evaluation indicating a change of mode transition, choosing the mode transition for the drone; and
outputting a control for the drone to negotiate the mode transition at the location along the journey.

* * * * *